US008579486B2

(12) United States Patent
Tsukamoto

(10) Patent No.: US 8,579,486 B2

(45) Date of Patent: Nov. 12, 2013

(54) VEHICULAR HEADLAMP APPARATUS INCLUDING A SEMICONDUCTOR LIGHT-EMITTING ELEMENT AND A REFLECTOR

(75) Inventor: Michio Tsukamoto, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 236 days.

(21) Appl. No.: 12/899,597

(22) Filed: Oct. 7, 2010

(65) Prior Publication Data

US 2011/0085347 A1 Apr. 14, 2011

(30) Foreign Application Priority Data

Oct. 9, 2009 (JP) ................................ 2009-235598

(51) Int. Cl.
*B60Q 1/00* (2006.01)

(52) U.S. Cl.
USPC ............ 362/538; 362/516; 362/517; 362/518

(58) Field of Classification Search
USPC ............ 362/538, 545, 516–519, 296.01, 297, 362/304, 307–308
See application file for complete search history.

(56) References Cited

U.S. PATENT DOCUMENTS

| | | | | |
|---|---|---|---|---|
| 6,851,843 | B2 * | 2/2005 | Muller et al. | 362/555 |
| 8,297,813 | B2 * | 10/2012 | Hara | 362/516 |
| 2007/0279927 | A1 * | 12/2007 | Yamamichi et al. | 362/545 |

FOREIGN PATENT DOCUMENTS

| | | | |
|---|---|---|---|
| JP | 2007-188736 | A | 7/2007 |
| JP | 2007-272207 | A | 10/2007 |
| JP | 2008-226706 | A | 9/2008 |
| JP | 2009-054392 | A | 3/2009 |

OTHER PUBLICATIONS

Office Action issued in corresponding Japanese Patent Application No. 2009-235598 dated Aug. 27, 2013.

* cited by examiner

*Primary Examiner* — Robert May
(74) *Attorney, Agent, or Firm* — Sughrue Mion, PLLC

(57) ABSTRACT

A vehicular headlamp apparatus includes: a lamp body; a translucent cover having a slanted portion; and a lamp unit. A semiconductor light-emitting element is mounted on a mounting surface so that its irradiation axis intersects with lamp unit's optical axis. Reflector's reflective surface reflects light from the semiconductor light-emitting element toward a vehicle front. One end of the reflective surface is located on a vehicle rear side of the light-emitting element. The other end protrudes toward a vehicle front from a front side end of the mounting portion. The reflective surface has a portion protruding toward the vehicle front from the front side end to face the slanted portion. Within a light distribution pattern, rays of light reflected by first area, second area adjacent to the first area and third area on the reflective surface respectively form a horizontal cut-off line, an oblique cut-off line and a diffusion portion.

11 Claims, 3 Drawing Sheets

VEHICULAR HEADLAMP APPARATUS INCLUDING A SEMICONDUCTOR LIGHT-EMITTING ELEMENT AND A REFLECTOR

INCORPORATION BY REFERENCE

The disclosure of Japanese Patent Application No. 2009-235598 filed on Oct. 9, 2009 including the specification, drawings and abstract is incorporated herein by reference in its entirety.

BACKGROUND OF THE INVENTION

1. Field of the Invention

The invention relates to a vehicular headlamp apparatus and, more particularly, to a vehicular headlamp apparatus used in an automobile, or the like.

2. Description of the Related Art

As a related art, there is proposed a vehicular headlamp apparatus that accommodates a lamp unit in a lamp chamber defined by a lamp body and a translucent cover. The lamp unit has a semiconductor light-emitting element as a light source. For example, Japanese Patent Application Publication No. 2008-226706 (JP-A-2008-226706) describes a configuration in which three LEDs are uniformly arranged on an outer peripheral portion of a substantially cylindrical or substantially hemispherical lamp unit. In this configuration, an oblique cut portion is formed by a first semiconductor light-emitting element, a diffusion portion having a horizontal cut-off line is formed by a second semiconductor light-emitting element, and then these semiconductor light-emitting elements are used in combination to form a low beam light distribution pattern. In addition, a high beam light distribution pattern is formed by a third semiconductor light-emitting element. Thus, different partial light distribution patterns are respectively formed by the plurality of semiconductor light-emitting elements and then those semiconductor light-emitting elements are used in combination to form a light distribution pattern. By so doing, it is possible to compensate for an insufficient amount of light of the semiconductor light-emitting elements or form light distribution patterns having various shapes.

In recent years, with a change in design of a vehicle, a vehicular headlamp apparatus that includes a translucent cover slanted in a vehicle longitudinal direction has been frequently employed. When the vehicular headlamp apparatus having a slanted translucent cover accommodates the above described substantially cylindrical or substantially hemispherical lamp unit, a lamp unit is arranged so as to protrude by a large amount toward a vehicle body with respect to a slanted surface of the translucent cover. Therefore, the size in a substantially vertical direction with respect to the slanted surface of the translucent cover, that is, the size in the depth direction, increases in the vehicular headlamp apparatus and, therefore, the size of the vehicular headlamp apparatus increases.

SUMMARY OF INVENTION

The invention provides a vehicular headlamp apparatus that is provided with a slanted translucent cover.

An aspect of the invention relates to a vehicular headlamp apparatus. The vehicular headlamp apparatus includes: a lamp body that has an opening section at a vehicle front side; a translucent cover that is attached so as to cover the opening section; and a lamp unit that is provided in a lamp chamber defined by the lamp body and the translucent cover, and that includes a light source mounting portion, a semiconductor light-emitting element that serves as a light source and a reflector that has a reflective surface reflecting light, irradiated from the semiconductor light-emitting element, toward a vehicle front. In the headlamp apparatus, the translucent cover has a slanted portion that is slanted with respect to a plane perpendicular to an optical axis of the lamp unit, the optical axis extending in a vehicle longitudinal direction, the semiconductor light-emitting element is mounted on the light source mounting portion so that an irradiation axis of the semiconductor light-emitting element intersects with the optical axis of the lamp unit, one end of the reflective surface is located on a vehicle rear side with respect to the semiconductor light-emitting element, the other end of the reflective surface protrudes toward the vehicle front from a vehicle front side end of the light source mounting portion, the reflective surface has a portion that protrudes toward the vehicle front from the vehicle front side end of the light source mounting portion to face the slanted portion, a first area, a second area that is located adjacent to the first area and a third area are asset on the reflective surface, wherein the first area includes a portion that intersects with a plane that includes the optical axis and the irradiation axis, light reflected by the first area forms a horizontal cut-off line within a light distribution pattern, light reflected by the second area forms an oblique cut-off line within the light distribution pattern, and light reflected by the third area forms a diffusion portion within the light distribution pattern.

With the present invention, the size of the vehicular headlamp apparatus provided with a slanted translucent cover may be reduced.

BRIEF DESCRIPTION OF DRAWINGS

The features, advantages, and technical and industrial significance of this invention will be described below with reference to the accompanying drawings, in which like numerals denote like elements, and wherein.

DETAILED DESCRIPTION OF EMBODIMENTS

Figure 1:
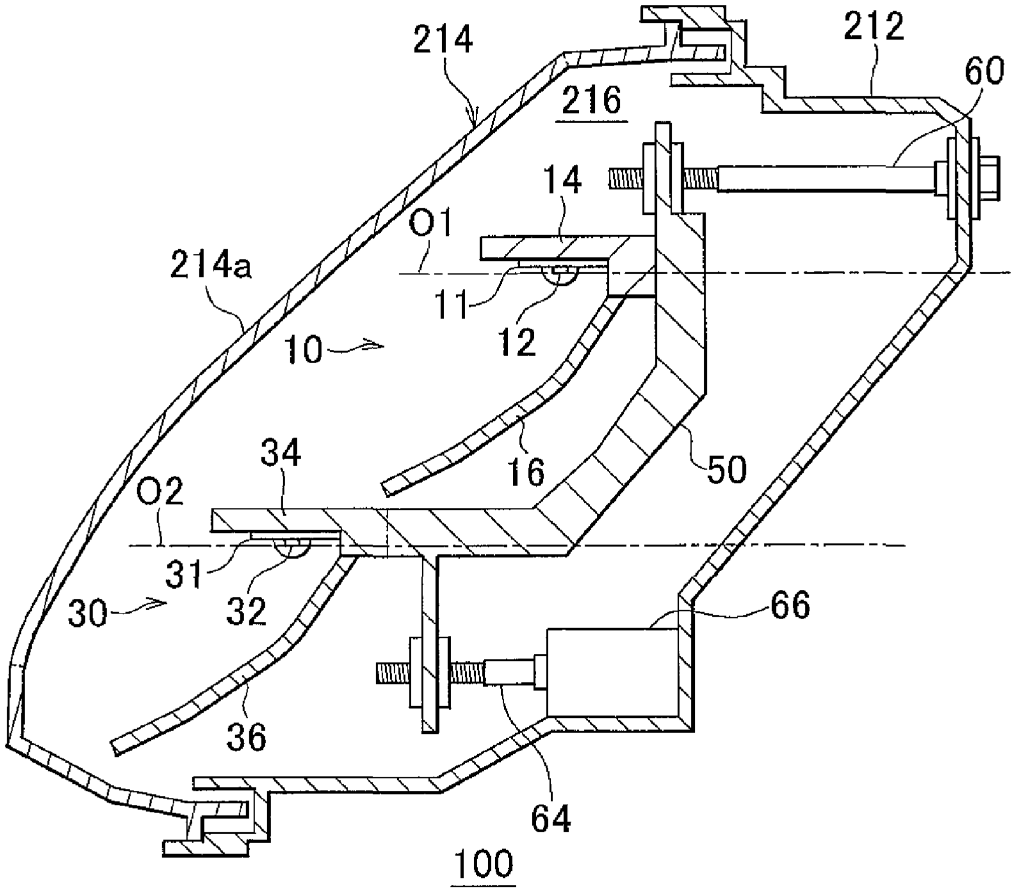
FIG. 1 is a schematic vertical cross-sectional view that illustrates the internal structure of a vehicular headlamp apparatus according to an embodiment of the invention.

Hereinafter, an embodiment of the invention will be described in detail with reference to the accompanying drawings. Like reference numerals denote the same or equivalent components, members and processes shown in the drawings, and the overlap description is omitted where appropriate.

FIG. 1 is a schematic vertical cross-sectional view that illustrates the internal structure of a vehicular headlamp apparatus according to the embodiment. As shown in FIG. 1, the vehicular headlamp apparatus 100 according to the embodiment includes a lamp body 212 and a translucent cover 214. The lamp body 212 has an opening at its vehicle front side. The translucent cover 214 is attached so as to cover the opening of the lamp body 212. The translucent cover 214 has a slanted portion 214*a* that is slanted in a vehicle longitudinal direction. A lamp chamber 216 is defined by the lamp body 212 and the translucent cover 214. A lamp unit 10 and a lamp unit 30 are accommodated in the lamp chamber 216. In addition, a bracket 50 that supports the lamp unit 10 and the lamp unit 30 is accommodated in the lamp chamber 216.

The lamp unit 10 is a reflector lamp unit that forms a low beam light distribution pattern. The lamp unit 10 includes a semiconductor light-emitting element 12, a light source mounting portion 14 and a reflector 16. The semiconductor light-emitting element 12 serves as a light source mounted on an insulating substrate 11. The semiconductor light-emitting element 12 is mounted on the light source mounting portion 14. The reflector 16 reflects light, irradiated from the semiconductor light-emitting element 12, toward a vehicle front. The lamp unit 10 has an optical axis O1. The structure of the lamp unit 10 will be described in detail later.

The lamp unit 30 is a reflector lamp unit that forms a high beam light distribution pattern. The lamp unit 30 includes a semiconductor light-emitting element 32, a light source mounting portion 34 and a reflector 36. The semiconductor light-emitting element 32 serves as a light source mounted on an insulating substrate 31. The semiconductor light-emitting element 32 is mounted on the light source mounting portion 34. The reflector 36 reflects light, irradiated from the semiconductor light-emitting element 32, toward the vehicle front. The lamp unit 30 has an optical axis O2.

The bracket 50 has threaded holes at predetermined positions of the peripheral portion. An aiming screw 60 and a leveling shaft 64 are screwed into the threaded holes. The aiming screw 60 and the leveling shaft 64 extend forward through the lamp body 212. By so doing, the bracket 50 is attached to the lamp body 212. The leveling shaft 64 is connected to a leveling actuator 66. The light source mounting portion 14 and the light source mounting portion 34 are connected to the bracket 50 so as to protrude toward the vehicle front. In the present embodiment, the light source mounting portion 14 is arranged above the light source mounting portion 34 and is connected to the bracket 50. The light source mounting portion 34 is arranged below the light source mounting portion 14 and is integrally formed with the bracket 50. The vehicular headlamp apparatus 100 is configured so as to be able to adjust the optical axis O1 of the lamp unit 10 and the optical axis O2 of the lamp unit 30 horizontally or vertically by the aiming screw 60, the leveling shaft 64 and the leveling actuator 66. A radiator fin is provided on a vehicle rear side surface of the bracket 50. The radiator fin radiates heat generated in the semiconductor light-emitting element 12 or the semiconductor light-emitting element 32. In addition, a fan that blows air toward the radiator fin to cool the radiator fin may be provided in the lamp chamber 216.

Figure 2:
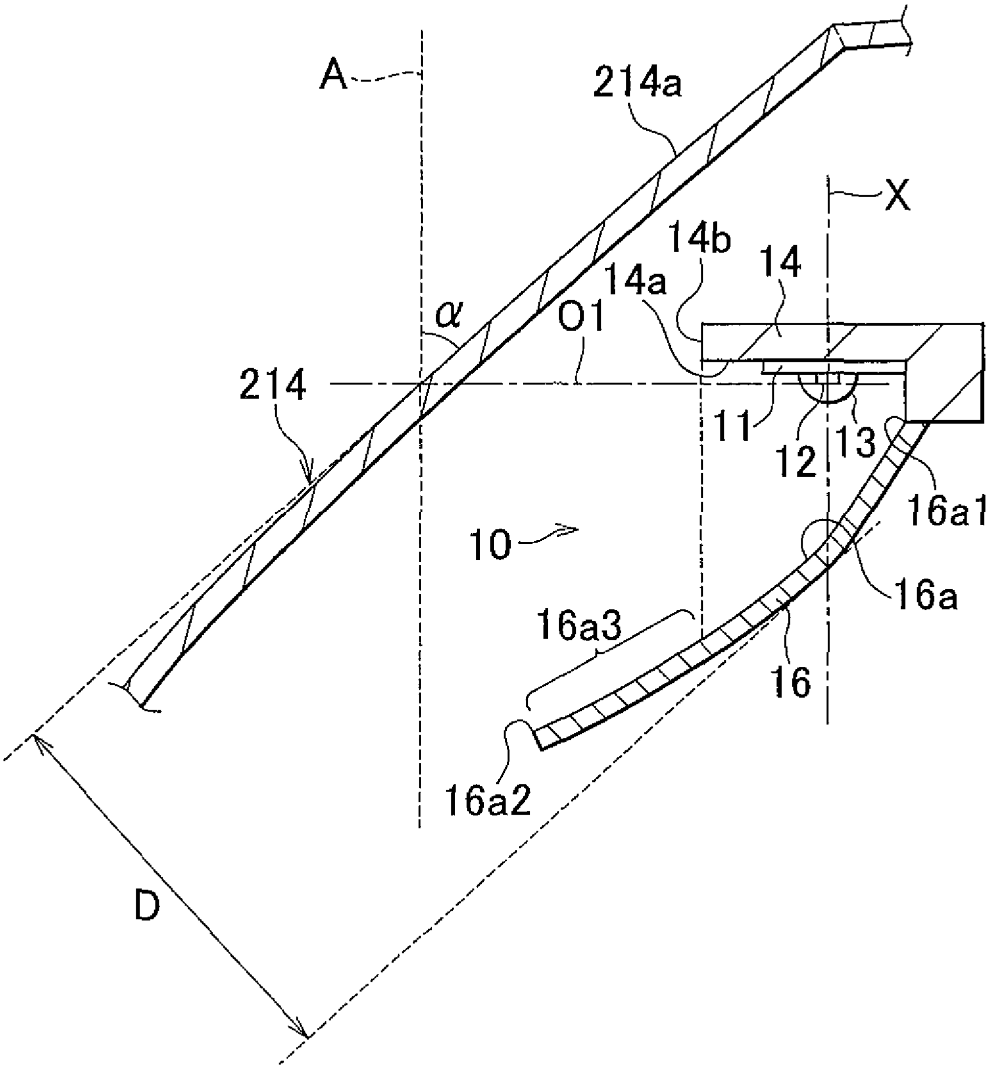
FIG. 2 is a view that illustrates the positional relationship between the shape of a lamp unit and a translucent cover.
Figure 3A:
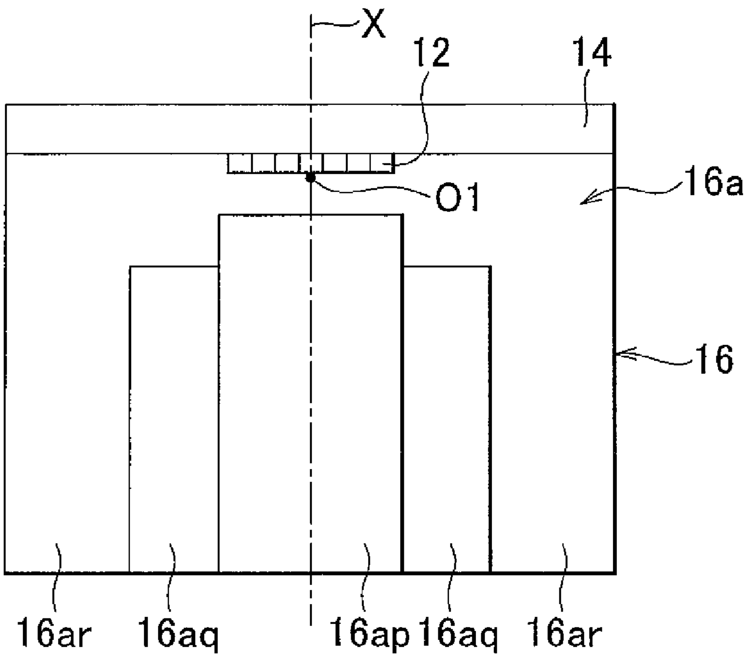
FIG. 3A is a schematic front view of the lamp unit.
Figure 3B:
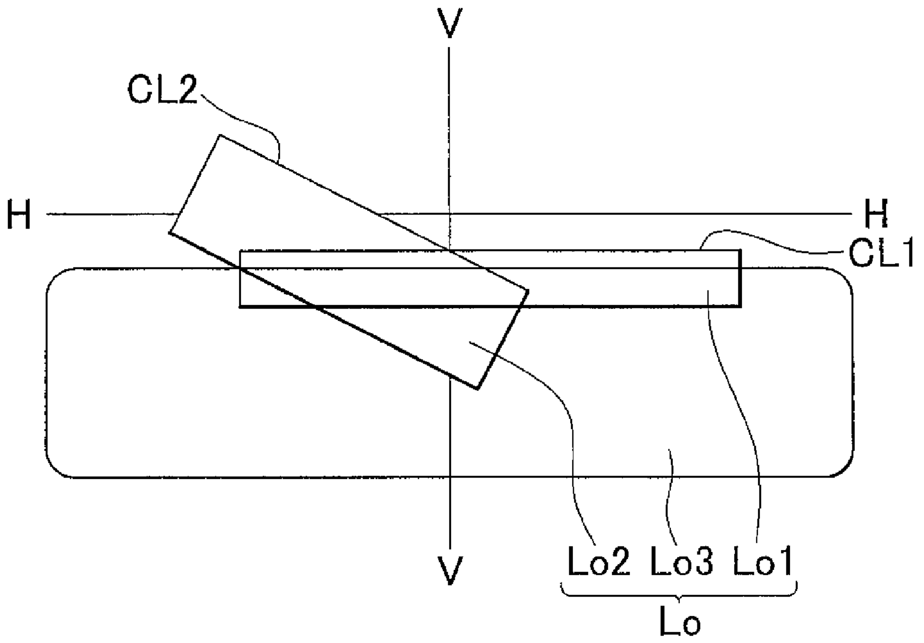
FIG. 3B is a view that illustrates the shape of a light distribution pattern formed by the lamp unit.

Next, the structure of the lamp unit 10 will be described in detail with reference to FIG. 2, FIG. 3A and FIG. 3B. FIG. 2 is a view that illustrates the positional relationship between the shape of the lamp unit and the translucent cover. FIG. 3A is a schematic front view of the lamp unit. FIG. 3B is a view that illustrates the shape of a light distribution pattern formed by the lamp unit. Note that FIG. 3B shows a light distribution pattern formed on an imaginary vertical screen arranged at a predetermined location ahead of the lamp, for example, a location 25 meters ahead of the lamp.

The semiconductor light-emitting element 12 is, for example, a light-emitting diode (LED). The semiconductor light-emitting element 12 is covered with a substantially hemispherical cap 13 and is arranged on the insulating substrate 11 made of ceramic, or the like. The semiconductor light-emitting element 12 is mounted on a light source mounting surface 14*a* substantially parallel to the optical axis O1 of the light source mounting portion 14 so that the irradiation axis X intersects with the optical axis O1. Specifically, the semiconductor light-emitting element 12 is mounted on the light source mounting surface 14*a* via the insulating substrate 11 in a state where the light emitting surface is directed substantially vertically downward and the irradiation axis X is perpendicular to the optical axis O1 of the lamp unit 10.

The reflector 16 has a reflective surface 16*a* of which the cross section taken along the plane that includes the optical axis O1 and the irradiation axis X of the semiconductor light-emitting element 12 has a substantially parabolic shape. Note that the semiconductor light-emitting element 12 may be arranged at the focal point of the parabola, and the axis of the parabola may be parallel to the optical axis O1 of the lamp unit 10. In the present embodiment, the reflective surface 16*a* is formed of a parabolic cylinder. One end of the reflector 16 is fixed to the light source mounting portion 14. Here, the slanted portion 214*a* of the translucent cover 214 is slanted at an angle α with respect to an imaginary plane A that is perpendicular to the optical axis O1 of the lamp unit 10, the optical axis O1 extending in the vehicle longitudinal direction. Then, the reflector 16 is arranged so that a vehicle rear side end 16*a*1 (au upper end as one end) of the reflective surface 16*a* is located on a vehicle rear side with respect to the semiconductor light-emitting element 12, a vehicle front side end 16*a*2 (a lower end as the other end) of the reflective surface 16*a* protrudes toward the vehicle front from a vehicle front side end 14*b* of the light source mounting portion 14 and a protruding portion 16*a*3 of the reflective surface 16*a* protrudes toward the vehicle front from the vehicle front side end 14*b* of the light source mounting portion 14 to face the slanted portion 214*a*. Here, the distance between the vehicle rear side end 16*a*1 and the slanted portion 214*a* may be equal to the distance between the vehicle front side end 16*a*2 and the slanted portion 214*a*.

As shown in FIG. 3A, the semiconductor light-emitting element 12 is formed of a plurality of light-emitting elements that are arranged in a direction perpendicular to the optical axis O1. In addition, the reflective surface 16*a* of the reflector 16 includes a first area 16*ap*, second areas 16*aq* and a third area 16*ar*. The first area 16*ap* includes a portion that intersects with the plane including the optical axis O1 and the irradiation axis X. The second areas 16*aq* are located adjacent to the first area 16*ap*. The third area 16*ar* is located adjacent to the second areas 16*aq*. The reflective surface 16*a* is configured to form a horizontal cut portion Lo1, including a horizontal cut-off line CL1 show in FIG. 3B, by light reflected by the first area 16*ap*. In addition, the reflective surface 16*a* is configured to form an oblique cut portion Lo2, including an oblique cut-off line CL2 shown in FIG. 3B, by light reflected by at least one of the two second areas 16*aq* adjacent to the first area 16*ap*. In addition, the reflective surface 16*a* is configured to form a diffusion portion Lo3 shown in FIG. 3B by light reflected by the third area 16*ar* adjacent to the second areas 16*aq*. Light irradiated from the semiconductor light-emitting element 12 is reflected by the reflective surface 16*a* and is emitted toward the vehicle front, and then the horizontal cut portion Lo1, the oblique cut portion Lo2 and the diffusion portion Lo3 are combined to form a low beam light distribution pattern Lo having the horizontal cut-off line CL1 and the oblique cut-off line CL2. The low beam light distribution pattern Lo is a left-hand traffic low beam light distribution pattern that is considered for a vehicle ahead and a pedestrian not to experience glare in a region of left-hand traffic regulations. Here, the distance between each second area 16*aq* and the plane that includes the optical axis O1 and the irradiation axis X of the semiconductor light-emitting element 12 may be larger than the distance between the first area 16*ap* and the plane that includes the optical axis O1 and the irradiation axis X of the semiconductor light-emitting element 12. Furthermore, the average amount of light per unit area, reflected by each second area 16*aq*, may be smaller than the average amount of light per unit area, reflected by the first area 16*ap*, and the average amount of light per unit area, reflected by the third area 16*ar*, may be smaller than the average amount of light per unit area, reflected by each second area 16*aq*.

With the above configuration, in the vehicular headlamp apparatus 100 that includes the lamp unit 10 that is able to form the low beam light distribution pattern Lo, the size in a substantially vertical direction with respect to the surface of the slanted portion 214*a* of the translucent cover 214, that is, the size D in the depth direction (depth), in a region that includes the translucent cover 214 and the lamp unit 10 may be reduced. As a result, the depth of the vehicular headlamp apparatus 100 may be reduced, so the size and thickness of the vehicular headlamp apparatus 100 may be reduced.

Note that the second areas 16*aq* may be configured so that one of the two second areas 16*aq* forms the oblique cut-off line CL2 of the left-hand traffic low beam light distribution pattern and the other one forms an oblique cut-off line of a right-hand traffic low beam light distribution pattern, that is, so-called "Dover low beam", used in a region of right-hand traffic regulations. The oblique cut-off line CL2 is, for example, a 15° cut-off line.

The lamp unit 30 also has a shape similar to that of the lamp unit 10 except the shape of the reflective surface of the reflector 36. That is, the semiconductor light-emitting element 32 is mounted on the light source mounting surface of the light source mounting portion 34 so that the irradiation axis intersects with the optical axis O2 of the lamp unit 30. The light source mounting surface of the light source mounting portion 34 is substantially parallel to the optical axis O2. Specifically, the semiconductor light-emitting element 32 is mounted on the light source mounting surface via an insulating substrate 31 in a state where the light emitting surface is directed substantially vertically downward and the irradiation axis is perpendicular to the optical axis O2. In addition, the reflector 36 has a reflective surface of which the cross section taken along the plane that includes the optical axis O2 and the irradiation axis of the semiconductor light-emitting element 32 has a substantially parabolic shape. One end of the reflector 36 is fixed to the light source mounting portion 34. Then, the reflector 36 is arranged so that a vehicle rear side end of the reflective surface is located on a vehicle rear side with respect to the semiconductor light-emitting element 32, a vehicle front side end protrudes toward the vehicle front from the vehicle front side end of the light source mounting portion 34 and a protruding portion of the reflective surface protrudes toward the vehicle front from the vehicle front side end of the light source mounting portion 34 to face the slanted portion 214*a*. With the above configuration, the size in the depth direction (depth) in a region that includes the translucent cover 214 and the lamp unit 30 may be reduced. Therefore, even when the lamp unit 30 that is able to form a high beam light distribution pattern is provided, the depth of the vehicular headlamp apparatus 100 may be reduced, and the size of the vehicular headlamp apparatus 100 may be reduced.

As described above, in the vehicular headlamp apparatus 100 according to the present embodiment, the translucent cover 214 has the slanted portion 214*a* that is slanted with respect to an imaginary plane A perpendicular to the optical axis O1 of the lamp unit 10. In addition, the semiconductor light-emitting element 12 of the lamp unit 10 is mounted on the light source mounting surface 14*a* so that the irradiation axis X intersects with the optical axis O1. The reflector 16 is arranged so that one end of the reflective surface 16*a* is located on a vehicle rear side with respect to the semiconductor light-emitting element 12, the other end protrudes toward the vehicle front from the vehicle front side end 14*b* of the light source mounting portion 14 and the protruding portion 16*a*3 of the reflective surface 16*a* protrudes toward the vehicle front from the vehicle front side end 14*b* of the light source mounting portion 14 to face the slanted portion 214*a*. In addition, the reflective surface 16*a* is configured so that the first area 16*ap* forms the horizontal cut-off line CL1, the second areas 16*aq* form the oblique cut-off line CL2 and the third area 16*ar* forms the diffusion portion Lo3. Therefore, in the vehicular headlamp apparatus 100 that is able to form the low beam light distribution pattern Lo, the size in a substantially vertical direction with respect to the surface of the slanted portion 214*a*, that is, the size D in the depth direction (depth), in a region that includes the translucent cover 214 and the lamp unit 10 may be reduced. As a result, the depth of the vehicular headlamp apparatus 100 may be reduced, so the size of the vehicular headlamp apparatus 100 may be reduced.

A new embodiment derived from a combination of the above described embodiment and the following alternative embodiments has the advantageous effects of both the above embodiment and the alternative embodiments. For example, in the above described embodiment, the slanted portion 214*a* of the translucent cover 214 has a slanted shape and extends toward a vehicle rear as it goes from a vehicle lower side toward a vehicle upper side. Instead, the slanted portion 214*a* may have a slanted shape and extend toward a vehicle rear as it goes from an inner side in a vehicle transverse direction toward an outer side in the vehicle transverse direction. That is, in the above described embodiment, the vertical cross section of the translucent cover 214 has a slanted shape; instead, the horizontal cross section of the translucent cover 214 may have a slanted shape. In this case, the lamp unit 10 is provided in the lamp chamber 216 so that the light emitting surface of the semiconductor light-emitting element 12 is directed toward the inner side in the vehicle transverse direction and the irradiation axis X extends in the vehicle transverse direction so as to be perpendicular to the optical axis O1.

In addition, not only the lamp unit 10 that is able to form the low beam light distribution pattern Lo or the lamp unit 30 that is able to form the high beam light distribution pattern but also another lamp unit, such as a lamp unit that is able to form a fog lamp light distribution pattern, may have a similar configuration. By so doing, the size of the vehicular, headlamp apparatus 100 may be reduced.

One embodiment of the invention may be described below.

A vehicular headlamp apparatus according to the embodiment includes: a lamp body that has an opening section at a vehicle front side; a translucent cover that is attached so as to cover the opening section; and a lamp unit that is provided in a lamp chamber defined by the lamp body and the translucent cover and that includes a light source mounting portion, a semiconductor light-emitting element that serves as a light source and a reflector that has a reflective surface reflecting light, irradiated from the semiconductor light-emitting element, toward a vehicle front. In the headlamp apparatus, the translucent cover has a slanted portion that is slanted with respect to a plane perpendicular to an optical axis of the lamp unit, the optical axis extending in a vehicle longitudinal direction, the semiconductor light-emitting element is mounted on the light source mounting portion so that an irradiation axis of the semiconductor light-emitting element intersects with the optical axis of the lamp unit, one end of the reflective surface is located on a vehicle rear side with respect to the semiconductor light-emitting element, the other end of the reflective surface protrudes toward the vehicle front from a vehicle front side end of the light source mounting portion, the reflective surface has a portion that protrudes toward the vehicle front from the vehicle front side end of the light source mounting portion to face the slanted portion, a first area, a second area that is located adjacent to the first area and a third area are asset on the reflective surface, wherein the first area includes a portion that intersects with a plane that includes the optical axis and the irradiation axis, light reflected by the first area forms a horizontal cut-off line within a light distribution pattern, light reflected by the second area forms an oblique cut-off line within the light distribution pattern, and light reflected by the third area forms a diffusion portion within the light distribution pattern. With the above configuration, the size of the vehicular headlamp apparatus provided with a slanted translucent cover may be reduced.

In the above headlamp apparatus, the light source mounting portion may have a light source mounting surface that is substantially parallel to the optical axis, the semiconductor light-emitting element may be mounted on the light source mounting surface, a cross section of the reflective surface, taken along the plane that includes the optical axis and the irradiation axis, may have a shape of a substantially parabola, and the third area may be located adjacent to the second area.

In the headlamp apparatus, the light distribution pattern may be a low beam light distribution pattern.

In the above headlamp apparatus, a distance between the second area and the plane that includes the optical axis and the irradiation axis may be larger than a distance between the first area and the plane that includes the optical axis and the irradiation axis.

In the above headlamp apparatus, an average amount of light per unit area, reflected by the second area, may be smaller than an average amount of light per unit area, reflected by the first area, and an average amount of light per unit area, reflected by the third area, may be smaller than an average amount of light per unit area, reflected by the second area.

In the above headlamp apparatus, a distance between an upper end of the reflector and the slanted portion may be equal to a distance between a lower end of the reflector and the slanted portion.

In the above headlamp apparatus, the semiconductor light-emitting element may be formed of a plurality of light-emitting elements that are arranged in a direction perpendicular to the optical axis of the lamp unit.

In the above headlamp apparatus, the irradiation axis of the semiconductor light-emitting element may be perpendicular to the optical axis of the lamp unit, the semiconductor light-emitting element may be arranged at a focal point of the parabola, and an axis of the parabola may be parallel to the optical axis of the lamp unit.

While some embodiments of the invention have been illustrated above, it is to be understood that the invention is not limited to details of the illustrated embodiments, but may be embodied with various changes, modifications or improvements, which may occur to those skilled in the art, without departing from the scope of the invention.

What is claimed is:

1. A vehicular headlamp apparatus comprising:

a lamp body that has an opening section at a vehicle front side;

a translucent cover that is attached so as to cover the opening section; and a lamp unit that is provided in a lamp chamber defined by the lamp body and the translucent cover, and that includes a light source mounting portion, a semiconductor light-emitting element that serves as a light source and a reflector that has a reflective surface reflecting light, irradiated from the semiconductor light-emitting element, toward a vehicle front, wherein the translucent cover has a slanted portion that is slanted with respect to a plane perpendicular to an optical axis of the lamp unit, the optical axis extending in a vehicle longitudinal direction, the semiconductor light-emitting element is mounted on the light source mounting portion so that an irradiation axis of the semiconductor light-emitting element intersects with the optical axis of the lamp unit, one end of the reflective surface is located on a vehicle rear side with respect to the semiconductor light-emitting element, the other end of the reflective surface protrudes toward the vehicle front from a vehicle front side end of the light source mounting portion, the reflective surface has a portion that protrudes toward the vehicle front from the vehicle front side end of the light source mounting portion to face the slanted portion, a first area, a second area that is located adjacent to the first area and a third area are set on the reflective surface, the first area includes a portion that intersects with a plane that includes the optical axis and the irradiation axis, light reflected by the first area forms a horizontal cut-off line within a light distribution pattern, light reflected by the second area forms an oblique cut-off line within the light distribution pattern, and light reflected by the third area forms a diffusion portion within the light distribution pattern;

wherein the light distribution pattern is a low beam light distribution pattern;

only the first area forms the horizontal cut-off line, and only the second area forms the oblique cut-off line.

2. The headlamp apparatus according to claim 1, wherein the light source mounting portion has a light source mounting surface that is substantially parallel to the optical axis, and the semiconductor light-emitting element is mounted on the light source mounting surface.

3. The headlamp apparatus according to claim 1, wherein the third area is located adjacent to the second area.

4. The headlamp apparatus according to claim 1, wherein a distance between the second area and the plane that includes the optical axis and the irradiation axis is larger than a distance between the first area and the plane that includes the optical axis and the irradiation axis.

5. The headlamp apparatus according to claim 1, wherein an average amount of light per unit area, reflected by the second area, is smaller than an average amount of light per unit area, reflected by the first area, and an average amount of light per unit area, reflected by the third area, is smaller than an average amount of light per unit area, reflected by the second area.

6. The headlamp apparatus according to claim 1, wherein a distance between an upper end of the reflector and the slanted portion is equal to a distance between a lower end of the reflector and the slanted portion.

7. The headlamp apparatus according to claim 1, wherein the semiconductor light-emitting element is formed of a plurality of light-emitting elements that are arranged in a direction perpendicular to the optical axis of the lamp unit.

8. The headlamp apparatus according to claim 1, wherein the irradiation axis of the semiconductor light-emitting element is perpendicular to the optical axis of the lamp unit.

9. The headlamp apparatus according to claim 1, wherein a cross section of the reflective surface, taken along the plane that includes the optical axis and the irradiation axis, substantially has the shape of a parabola.

10. The headlamp apparatus according to claim 9, wherein the semiconductor light-emitting element is arranged at a focal point of the parabola.

11. The headlamp apparatus according to claim 9, wherein an axis of the parabola is parallel to the optical axis of the lamp unit.

* * * * *